United States Patent [19]

Kobayashi et al.

[11] Patent Number: 5,317,406
[45] Date of Patent: May 31, 1994

[54] IMAGE READING DEVICE AND IMAGE INFORMATION PROCESSING APPARATUS UTILIZING THE SAME

[75] Inventors: Isao Kobayashi, Sagamihara; Noriyuki Kaifu, Yokohama; Toshihiro Saika, Zama; Tadao Endo, Atsugi, all of Japan

[73] Assignee: Canon Kabushiki Kaisha, Tokyo, Japan

[21] Appl. No.: 73,980

[22] Filed: Jun. 8, 1993

Related U.S. Application Data

[63] Continuation of Ser. No. 786,771, Nov. 1, 1991, abandoned.

[30] Foreign Application Priority Data

Nov. 7, 1990 [JP] Japan ................. 2-299919

[51] Int. Cl.$^5$ .................... H04N 3/14; H04N 5/335
[52] U.S. Cl. .................... 348/307; 358/482
[58] Field of Search ........... 358/213.29, 213.11, 358/213.31, 213.27, 213.15

[56] References Cited

U.S. PATENT DOCUMENTS

| | | | |
|---|---|---|---|
| 4,390,791 | 6/1983 | Hatanaka et al. | 250/578 |
| 4,461,956 | 7/1984 | Hatanaka et al. | 250/578 |
| 4,589,026 | 5/1986 | Ozawa et al. | 358/213.27 |
| 4,593,320 | 6/1986 | Nishizawa et al. | 358/213.11 |
| 4,646,155 | 2/1987 | Miyazawa et al. | 358/213.11 |
| 4,723,129 | 2/1988 | Endo et al. | 346/1.1 |
| 4,740,796 | 4/1988 | Endo et al. | 346/1.1 |
| 4,745,488 | 5/1988 | Kaifu et al. | 358/294 |
| 4,791,469 | 12/1988 | Ohmi et al. | 357/30 |
| 4,827,345 | 5/1989 | Nakagawa et al. | 358/213.27 |
| 4,829,485 | 5/1989 | Hatanaka et al. | 365/239 |
| 4,831,454 | 5/1989 | Tanaka et al. | 358/213.31 |
| 4,835,404 | 5/1989 | Sugawa et al. | 250/578 |
| 4,868,405 | 9/1989 | Nakamura | 358/213.11 |
| 4,876,601 | 10/1989 | Hashimoto et al. | 358/213.26 |
| 4,886,977 | 12/1989 | Gofuku et al. | 250/578 |
| 4,916,304 | 4/1990 | Itabashi et al. | 250/211 R |
| 4,926,058 | 5/1990 | Iwamoto et al. | 250/578.1 |
| 4,963,955 | 10/1990 | Hatanaka et al. | 358/213.27 |
| 5,027,226 | 6/1991 | Nagata et al. | 358/213.11 |
| 5,051,831 | 9/1991 | Hashimoto | 358/213.11 |
| 5,060,040 | 10/1991 | Saika et al. | 357/30 |

FOREIGN PATENT DOCUMENTS

| | | | |
|---|---|---|---|
| 0365312 | 4/1990 | European Pat. Off. | H01L 31/18 |
| 2568077 | 1/1986 | France | H04N 1/40 |
| 2160058 | 12/1985 | United Kingdom | H04N 1/028 |

Primary Examiner—Joseph Mancuso
Assistant Examiner—Wendy R. Greening
Attorney, Agent, or Firm—Fitzpatrick, Cella, Harper & Scinto

[57] ABSTRACT

An image reading device includes a plurality of photoelectric converting elements, a plurality of accumulating elements corresponding to each of the photoelectric converting elements, and switching circuitry for reading out the signals accumulated in the accumulating elements. Each of the photoelectric converting elements comprises a switching portion and a sensor portion. Driving circuitry is provided for driving the photoelectric converting elements by activating the switching portions to release the charges accumulated in the accumulating elements through the photoelectric converting elements in order to reset the accumulated elements.

31 Claims, 10 Drawing Sheets

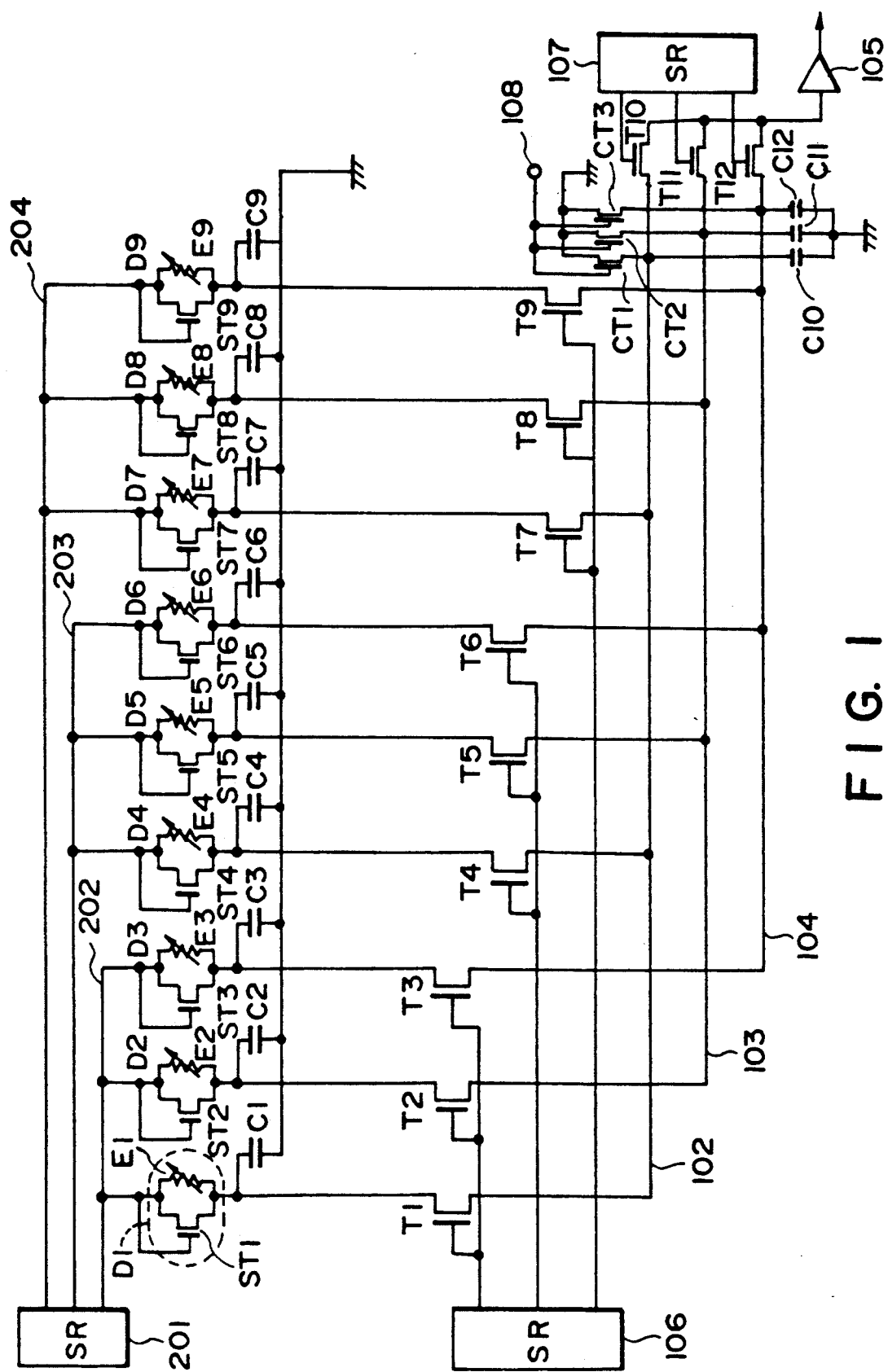
F I G. 1

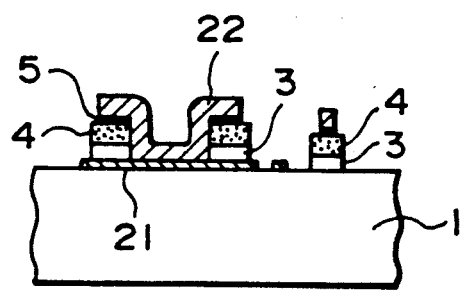
F I G. 4B
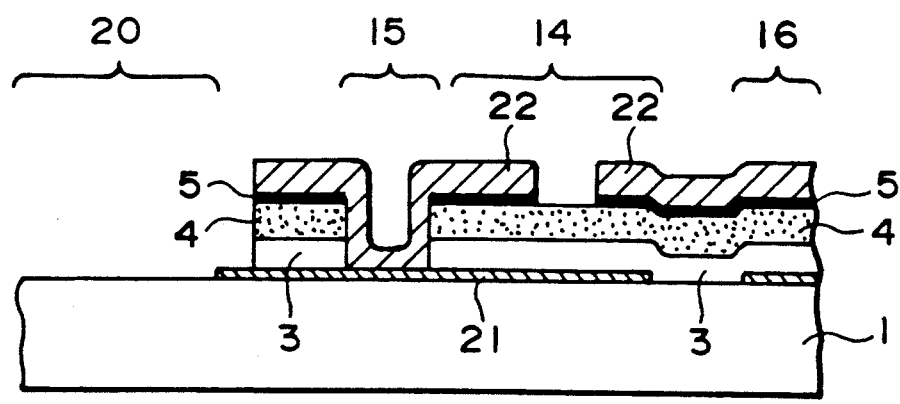
F I G. 4C

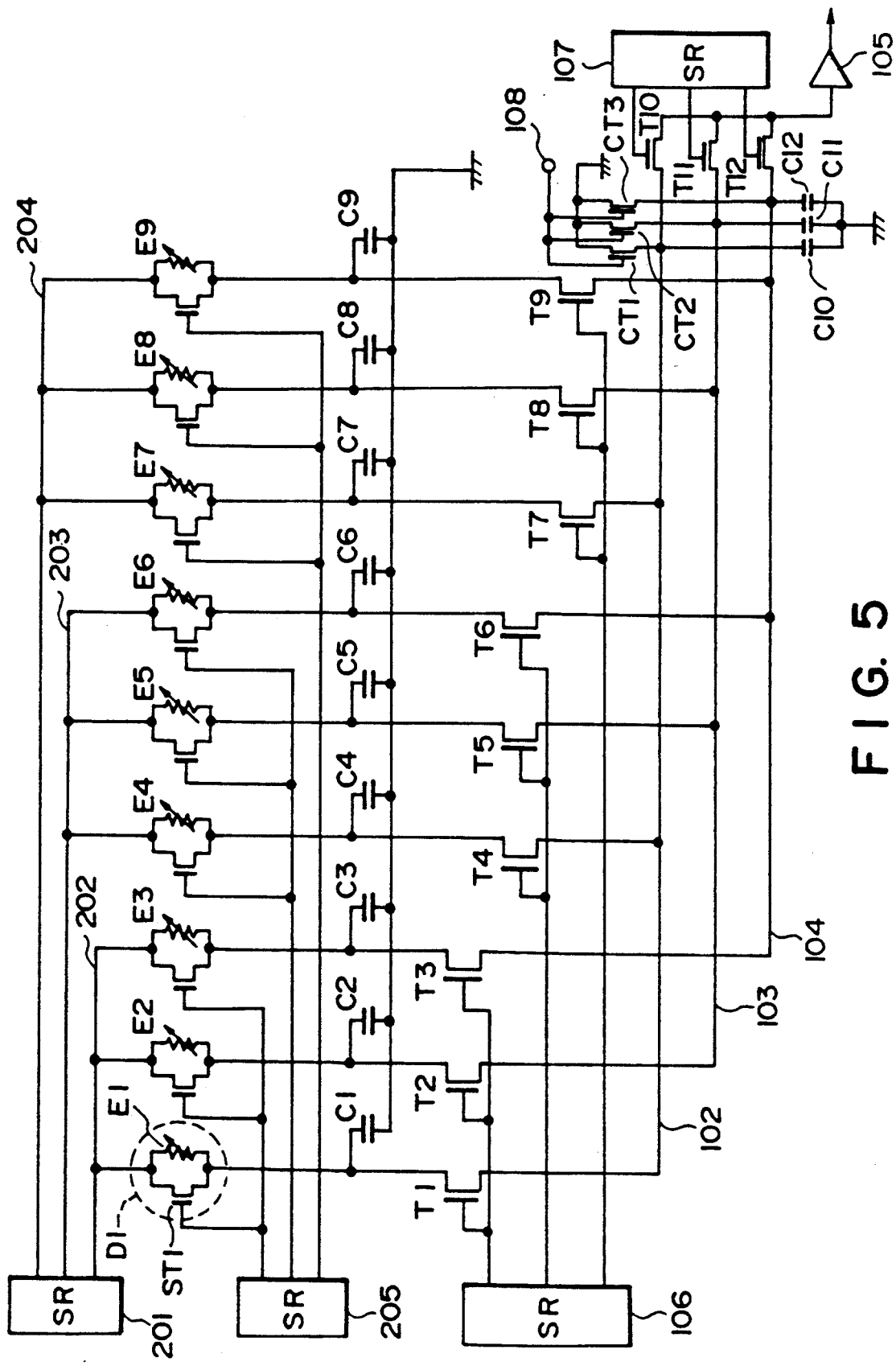
F I G. 5

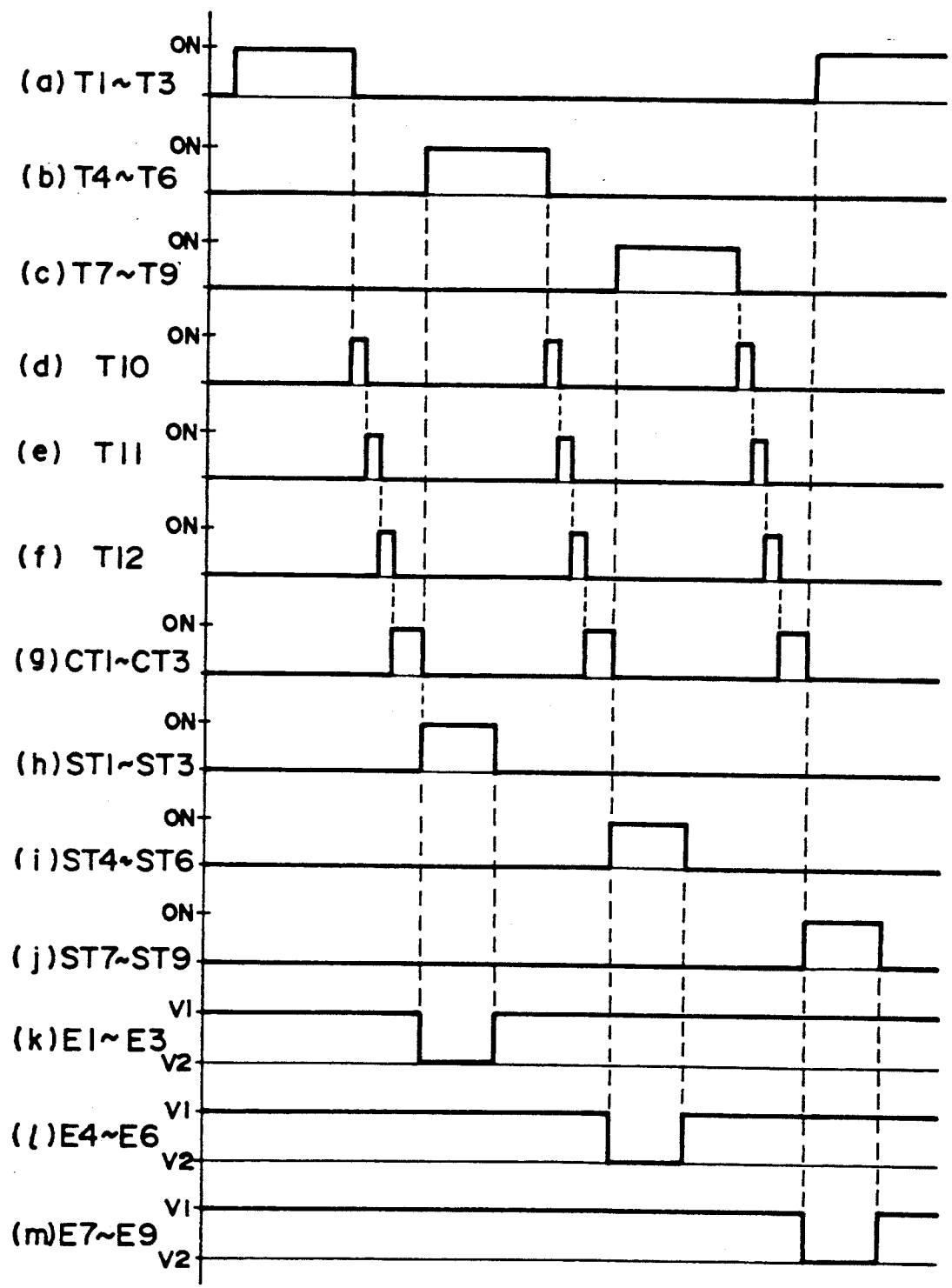
F I G. 6

IMAGE READING DEVICE AND IMAGE INFORMATION PROCESSING APPARATUS UTILIZING THE SAME

This application is a continuation of application Ser. No. 07/786,771 filed Nov. 1, 1991, now abandoned.

BACKGROUND OF THE INVENTION

1. Field of the Invention

The present invention relates to an image reading device, and more particularly to an image reading device provided with means for accumulating incident light information, adapted for use in a reader unit of an image information processing apparatus such as facsimile.

2. Related Background Art

There are already known various image reading methods for use in the image reading devices. Examples of such methods are frame transfer method and interline transfer method employed in CCD (charge coupled devices).

Also image reading circuit structures for use in the amplifying devices with improved S/N ratio are disclosed for example in the U.S. Pat. Nos. 4,791,469, 4,831,454, 4,835,404 and 4,876,601.

Furthermore, circuit structures adapted for use in thin film devices suitable for forming large area devices are disclosed, for example, in the U.S. Pat. Nos. 4,390,791, 4,461,956, 4,829,485 and 4,886,977.

Furthermore, the U.S. Pat. No. 4,963,955 discloses a circuit structure in which transistors constituting pixels are serially connected for every vertical line for enabling collective resetting. However these structures have a limit in reducing the resetting time, because of large parasite resistance and capacitance in the serially connected line of pixels.

In addition to the conventional structures mentioned above, there is also proposed a resetting method utilizing block drive.

FIG. 8 is a circuit diagram of a conventional image reading device, showing, as an example, a photosensor array with nine photosensors.

In the circuit shown in FIG. 8, among photosensors E1-E9, three constitute a block, and three blocks constitute the photosensor array. Capacitors C1-C9 and switching transistors T1-T9, respectively corresponding to the photosensors E1-E9, are similarly grouped.

Electrodes at a side (common electrodes) of the photosensors E1-E9 are connected to a power source 101, while the other electrodes (individual electrodes) are grounded through respectively capacitors C1-C9.

Also, the individual electrodes of a same cardinal number in different blocks of the photosensors E1-E9 are connected, through respective switching transistors T1-T9, to one of common lines 102-104.

More detailedly, first switching transistors T1, T4, T7 of different blocks are connected to the common line 102; second switching transistors T2, T5, T8 of different blocks are connected to the common line 103; and third switching transistors T3, T6, T9 of respective blocks are connected to the third common line 104.

Said common lines 102-104 are connected, respectively through switching transistors T10-T12, to an amplifier 105.

The gate electrodes of the switching transistors T1-T9 are commonly connected for each block, and are respectively connected to parallel output terminals of a shift register 106. Said output terminals release high-level signals in succession at predetermining timings, whereby the switching transistors T1-T9 are turned on in succession in the unit of each block.

Also, the gate electrodes of the switching transistors T10-T12 are respectively connected to parallel output terminals of a shift register 107. Said output terminals release high-level signals in succession at predetermined timings, whereby the switching transistors T10-T12 are turned on in succession.

The common lines 102-104 are also grounded respectively through capacitors C10-C12 and switching transistors CT1-CT3.

The capacitance of the capacitors C10-C12 is selected to be sufficiently larger than that of the capacitors C1-C9.

The gate electrodes of the switching transistors CT1-CT3 are commonly connected to a terminal 108. Thus, the application of a high-level signal to said terminal 108 turns on the switching transistors CT1-CT3 simultaneously, thereby grounding the common lines 102-104.

Such image reading device is disclosed in the U.S. Pat. No. 4,827,345.

In the following there will be explained the function of such conventional image reading device, with reference to a timing chart of the switching transistors T1-T12 and CT1-CT3, shown in FIG. 9. In FIG. 9 there is shown the timing when each switching transistor is turned on, and it also shows the timing of the release of a high-level signal from the shift register 106 or 107.

When the light enters the photosensors E1-E9, charges are accumulated in the capacitors C1-C9 from the power source 101 through the photosensors E1-E9, according to the intensity of said incident light.

Then the switching transistors T1-T3 are turned on when a high-level signal is released from the first output terminal of the shift register 106 (FIG. 9(a)).

With said switching transistors T1-T3 being turned on, the charges accumulated in the capacitors C1-C3 are respectively transferred to the capacitors C10-C12.

Subsequently the shift register 107 effects a shifting operation to turn on the switching transistors T10-T12 in succession [FIG. 9(d)-(f)], whereby the optical information of the first block transferred to and accumulated in the capacitors C10-C12 are read in succession and released through the amplifier 105.

After the reading of the information of the first block, an unrepresented circuit detects said reading and applies a high-level signal to the terminal 108, whereby the switching transistors CT1-CT3 are simultaneously turned on [FIG. 9(g)]. Thus the remaining charges in the capacitors C1-C3 and C10-C12 are dissipated, and said capacitors become ready for accumulating the optical information.

Then the shift register 106 effects a shift to release a high-level signal from the second output terminal, thereby turning on the switching transistors T4-T6 [FIG. 9(b)]. Thus the information reading of the second block is conducted in a similar manner as in the first block. Operations for the third block are also conducted in a similar manner.

As explained above, information are accumulated in the capacitors C1-C9, according to the shift timing of the shift registers 106, 107 and the timing of the high-level signal application to the terminal 108 as shown in FIG. 9. The information accumulated in said capacitors C1-C9 are transferred to the capacitors C10-C12 by the unit of each block at a time, and the information thus transferred are time-sequentially read by the switching transistors T10-T12.

However, the conventional structure has been associated with the following drawbacks, because of the on-resistance (resistance in "on" state) in the switching transistors:

(1) The timing constants, determined by the capacitances of the capacitors C1-C9 and the resistances of the corresponding switching transistors T1-T9 become large, and the discharging time of the capacitors C1-C9 becomes longer because of the parasite capacitances of the common lines 102-104 and the switching transistors T10-T13, the capacitances of the capacitors C10-C12 and the wiring resistances. Consequently, such image reading device requires a long time for the information reading operation;

(2) As the discharge of the capacitors C1-C9 requires a long time, it is limited to a certain time in practice, but the image reading operation becomes unreliable because the amount of the remaining charge in the capacitors C1-C9 varies depending on the light intensity.

SUMMARY OF THE INVENTION

An object of the present invention is to provide an image reading device provided with plural photoelectric converter elements, accumulating elements provided respectively corresponding to said photoelectric converter elements and adapted to accumulate the output signals thereof, and switching means for releasing the signals accumulated in said accumulating means in succession as optical information, wherein said photoelectric converter elements have a switching function, and means is provided for driving said photoelectric converter elements so as to release the accumulated charges from said accumulating elements through said photoelectric converter elements.

Another object of the present invention is to provide an image information processing apparatus comprising the above-mentioned image reading device, original support means for supporting an original, bearing image information thereon, in a reading position for said image reading device, and recording means for recording the image information read by said image reading device.

BRIEF DESCRIPTION OF THE DRAWINGS

FIG. 1 is a circuit diagram of an image reading device constituting a first embodiment of the present invention;

FIG. 4B is a cross-sectional view along a line X—X' in FIG. 4A;

FIG. 4C is a cross-sectional view along a line Y'Y' in FIG. 4A;

FIG. 5 is a circuit diagram of an image reading device constituting a second embodiment of the present invention;

FIG. 6 is a timing chart of the signals in the circuit shown in FIG. 5;

DETAILED DESCRIPTION OF THE PREFERRED EMBODIMENTS

Figure 2:
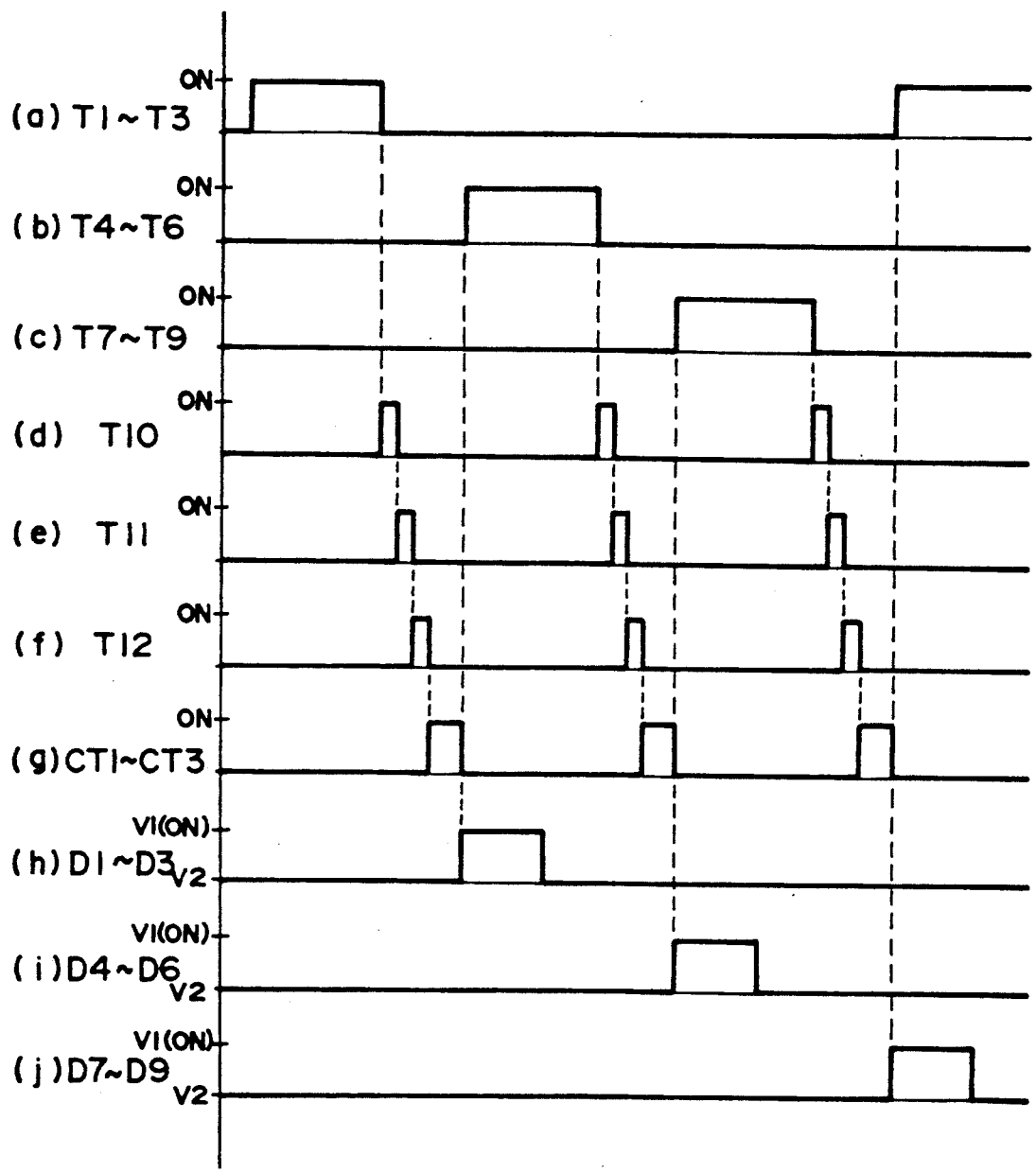
FIG. 2 is a timing chart of the signals in the circuit shown in FIG. 1.

The circuit structure of the present invention employs a unit cell composed of a photoelectric converting element connected to a charge accumulating element, wherein said photoelectric converting element comprises of a switching element showing different resistances between two terminals in on- and off-states.

Such unit cells are connected in parallel at least in each block, and the signal charges accumulated in the charge accumulating elements are dissipated, utilizing the switching characteristic of the photoelectric converting elements.

The structure of the present invention can reduce the resetting time, thereby contributing significantly to the improvement of the image reading speed.

The photoelectric converting element to be employed in the present invention can be any element with a switching function, such as an ordinary bipolar transistor or a gate-insulated field effect transistor.

The effect of the present invention is particularly evident in thin film elements, such as thin film transistors (TFT), employed for providing a large-area inexpensive sensor, because such elements have a high on-resistance. However the present invention is not limited to such thin film elements.

According to a preferred embodiment of the present invention, there is provided an image reading device of a circuit structure comprising:

a plurality of phototransistors of which main electrodes, one in each phototransistor, are connected in common and rendered selectively connectable to a reference voltage source and the other main electrodes are connected to accumulating means;

second accumulating means respectively connected to said plural phototransistors through switching means;

reading means for reading signals accumulated in said second accumulating means in succession; and resetting means connected to the control electrodes of said phototransistors and adapted to drive said phototransistors thereby dissipating signals accumulated in said accumulating means.

According to another preferred embodiment of the present invention, there is provided an image reading device of a circuit structure comprising:

a plurality of phototransistors (D1, D4, D7) of which main electrodes, one in each phototransistor, are rendered selectively connectable in succession to a reference voltage source (201) and the other main electrodes are connected to first accumulating means (C1, C4, C7);

second accumulating means (C10, C11, C12) connected respectively with said plural phototransistors through switch means (T1, T4, T7);

reading means (T10, T11, T12, 107, 105) for reading, in succession, signals accumulated in said second accumulating means; and resetting means (201) connected to the control electrodes of said phototransistors and adapted to drive said phototransistors thereby resetting signals accumulated in said accumulating means.

In the following, the present invention will be explained in detail by embodiments thereof shown in the attached drawings.

FIG. 1 is a circuit diagram of an image reading device constituting a first embodiment of the present invention.

Figure 8:
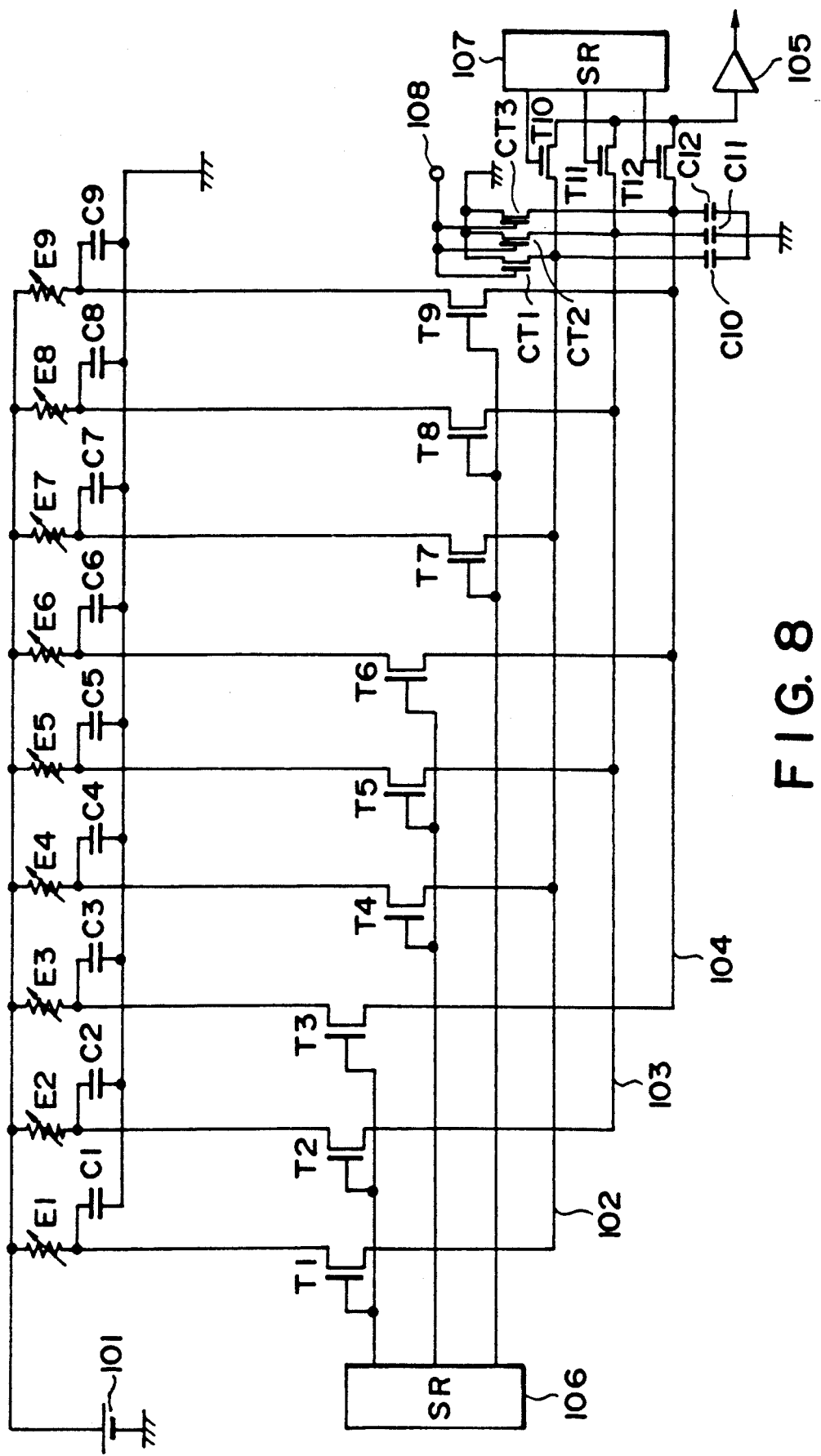
FIG. 8 is a circuit diagram of a conventional image reading device.
Figure 9:
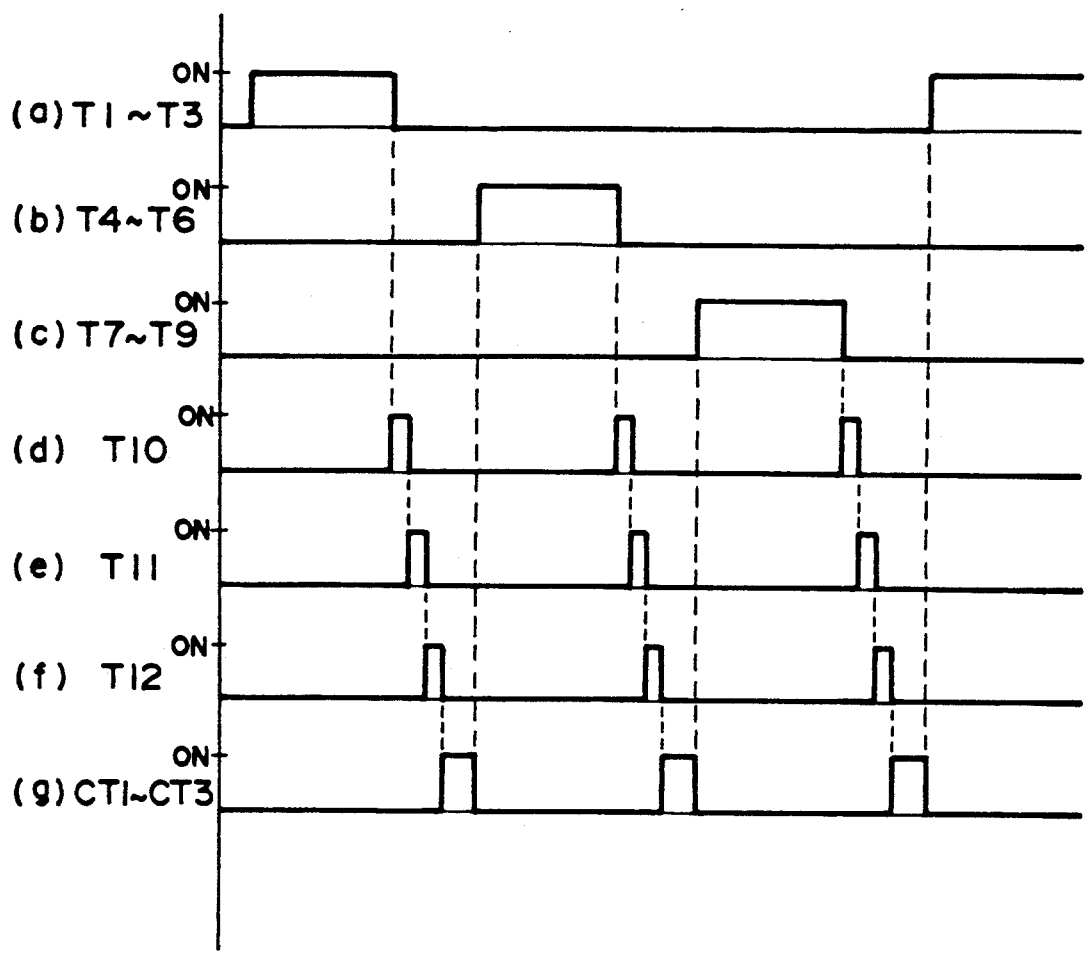
FIG. 9 is a timing chart of the signals in the circuit shown in FIG. 8.

In the present embodiment, capacitors C1–C12 constituting the first accumulating means, capacitors CT10–CT12 constituting the second accumulating means, switching transistors T1–T12, and shift transistors 106, 107 are the same as those in the conventional structure shown in FIG. 8, and will not be explained, therefore, in further detail.

In the present embodiment, elements D1–D9, corresponding to the phototransistors, have the functions as sensors E1–E9 having a photoconductive layer and as switching transistors ST1–ST9. The control electrodes of the switching transistors are connected to the respective common lines (202, 203, 204) of the blocks of the sensors E1–E9, and are connected in blocks to the output terminals of a shift register 201 which also serves as a reference voltage source.

Consequently, according to the timing of shift operation of the shift register 201, the switching transistors of the elements D1–D9 are in succession turned on by blocks, whereby the capacitors C1–C9 are charged to the high-level voltage V1 supplied from the shift register 201.

In the following, the function of the present embodiment of the above-explained structure will be explained with reference to a timing chart of the switching transistors T1–T12, CT1–CT3 and elements D1–D9 shown in FIG. 2. In FIG. 2 there is shown the timing when each switching transistor is turned on, and it is also the timing of release of high-level signal from the shift register 106, 107 or 201.

When light enters the photosensors E1–E9, the capacitors C1–C9 emit charges through the common electrodes, according to the intensity of said light.

In this state, the switching transistors remain turned off, since a low-level signal V2 is supplied to the common electrode 202 from the shift register 106.

Figure 3:
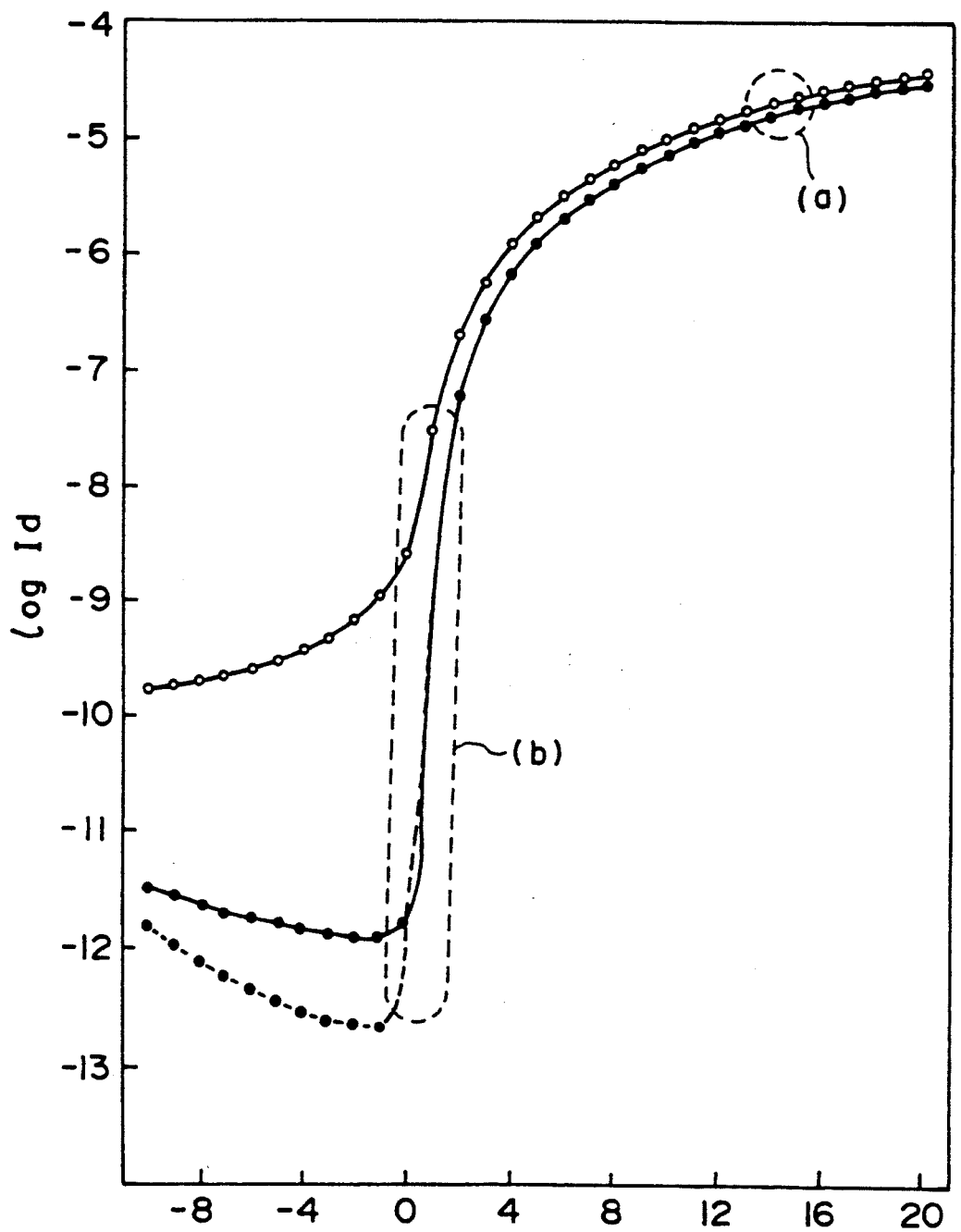
FIG. 3 is a characteristic chart of transistors employed as components in the device shown in FIG. 1.

FIG. 3 shows typical transistor characteristic of the elements D1–D9 employed in the present embodiment.

In FIG. 3, the abscissa indicates the gate-source potential $V_{gs}$ of the switching transistors ST1–ST9, while the ordinate indicates the drain-source current $I_{ds}$ in logarithmic scale. $I_{ds}$ when the gate electrode is maintained at the high-level state, for example V1 = 12 V, is indicated by (a) in FIG. 3. It does not vary much in the light and dark states, and is in a range of $1.0-1.5 \times 10^{-5}$ A in the illustrated example. On the other hand, $I_{ds}$ when the gate electrode is maintained at the low-level state, for example V2 = 0 V, is indicated by (b) in FIG. 3, and shows a difference of 1,000–10,000 times between the light and dark states.

The transistors ST1–ST9 preferably have a same characteristic, and the off-resistance in the dark state is structurally the same as the dark resistance of the sensors E1–E9. Also, the on-resistance is preferably 1/1000 to 1/10000 of the resistance of the sensors E1–E9 when receiving light. In the example shown in FIG. 3, this difference is about 1/10000.

The function of the circuit continues in the following manner. At first the shift register 106 releases the high-level signal from the first output terminal, thereby turning on the switching transistors T1–T3 [FIG. 2(a)].

Thus the charges remaining in the capacitors C1–C3, after discharge according to the light intensity, are respectively transferred to the capacitors C10–C12.

Subsequently, the shift register 107 serving as reading means shifts the high-level output signal, thereby turning on the switching transistors T10–T12, also serving as reading means, in succession [FIG. 2(d)–(f)].

In this manner the optical information of the first block, transferred to and accumulated in the capacitors C10–C12, are read through the amplifier 105.

Eventually, the optical information is defined by the decrease of the read information from the black level.

After the information reading of the first block, a high-level signal is applied to the terminal 108, thereby turning on the switching transistors CT1–CT3 simultaneously [FIG. 2(g)].

Thus the charges remaining in the capacitors C10–C12 are dissipated completely.

When said remaining charges of the capacitors C10–C12 are dissipated, the shift register 106 effects a shift to release the high-level signal from the second output terminal, thereby turning on the switching transistors T4–T6 [FIG. 2(b)]. Thus, the charges remaining, after the aforementioned discharge, in the capacitors C4–C6 of the second block, are respectively transferred to the capacitors C10–C12.

At the same time the shift register 201, serving as the resetting means, releases the high-level signal V1 from the first output terminal, now serving as the reference voltage source, whereby the switching transistors ST1–ST3 of the elements D1–D3 are turned on [FIG. 2(h)] and the capacitors C1–C3 are completely charged to the high-level voltage V1 supplied from the shift register 201.

As explained above, the charging operation for the capacitors C1–C3 of the first block is conducted, in parallel manner, with the transfer of the charges, remaining in the capacitors C4–C6 of the second block after discharge according to the light intensity, to the capacitors C10–C12.

Then, as in the case of the first block, the switching transistors T10–T12 are turned on in succession by the shifting operation of the shift register 107, whereby the optical information of the second block accumulated in the capacitors C10–C12 are read in succession [FIG. 2(d)–(f)].

The charge transfer operation for the third block is similarly conducted in parallel manner with the charging operation of the capacitors C4–C6 of the second block [FIG. 2(i)]. Thereafter, the above-explained operations are repeated by the unit of each block.

Figure 4A:
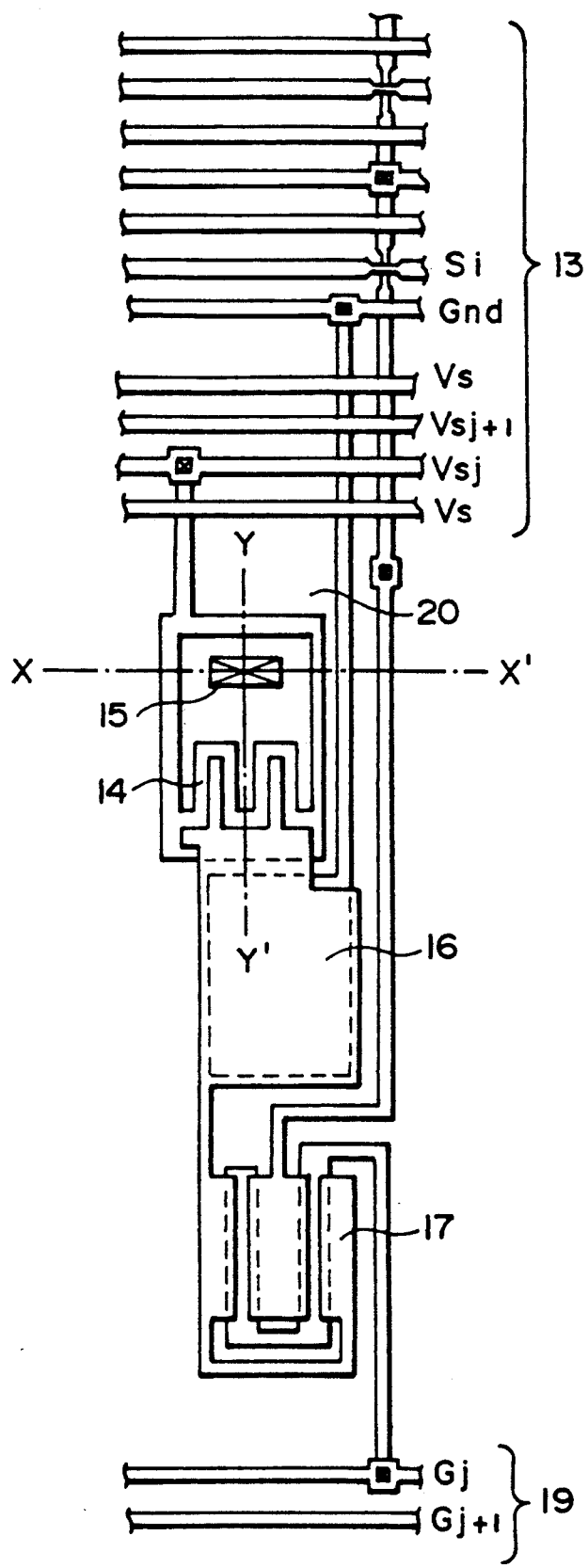
FIG. 4A is a schematic plan view of a part, corresponding to a bit, of the device shown in FIG. 1.

FIG. 4A is a schematic plan view of a part, corresponding to a bit, of the image reading device, FIG. 4B is a cross-sectional view along a line X—X' in FIG. 4A, and FIG. 4C is a cross-sectional view along a line Y—Y' in FIG. 4A. A description of FIGS. 4A, 4B, and 4C is provided as follows:

For the purpose of simplicity, FIG. 4A only shows the upper and lower wirings and the contact holes.

The image reading device is formed by integrating photoelectric converting elements, accumulating capacitors, thin film transistors, matrix signal wirings etc. on an insulating substrate, utilizing hydrogenated amorphous silicon (hereinafter written as a-Si:H) as a non-monocrystalline material.

In the above-mentioned drawings there are shown a matrix wiring part 13; a photoelectric converting part 14; a gate-source connecting contact hole 15; an accumulating capacitor 16; a transfer TFT 17; and a gate driving wiring part 19.

This embodiment is constructed as a so-called lensless image reading device which reads the image of the original by direct contact of the sensor part (photoelectric converting part) with the original without an imaging lens therebetween. For this reason, there is provided a window 20 for illuminating the original, and a lower gate electrode, serving as the control electrode of the photoelectric converting part 14, is formed with an opaque material, thus serving also as a light shield film for excluding the light other than that reflected from the original.

There are also shown a substrate 1 composed for example of glass, and a lower electrode 21 serving as the gate electrode of the photoelectric converting part in FIG. 4B.

An insulating layer 3 is composed for example of $SiN_xH$ or $SiO_2$. A photoelectric semiconductor layer 4 is composed for example of hydrogenated amorphous silicon (a-Si:H). An n+ layer 5 is provided for forming ohmic contact with an upper electrode 22 constituting source and drain electrodes, namely two main electrodes, of the photoelectric converting part.

As explained in the foregoing, as the accmulating capacitors of each block which has been subjected to information reading can be completely charged, the present embodiment can reduce the time required for transferring the information of each block to the capacitors C10–C12, and can improve the reliability of image reading.

The present embodiment has been described by a case of nine elements, serving as photosensors and phototransistors, divided into three blocks, but such structure is not limitative. Division of an arbitrary number of such elements into an arbitrary number of blocks is easily achievable from the present embodiment.

FIG. 5 is a circuit diagram of a second embodiment of the image reading device of the present invention.

In FIG. 5, components are the same as those in FIG. 1, and the basic function is therefore substantially the same as that in FIG. 1, except that the gate electrodes of the switching transistors ST1–ST9 are not connected to the common electrodes of the photosensors E1–E9 but to parallel output terminals of another shift register 205 constituting resetting means.

In the following there will be explained the function of the second embodiment of the above-explained structure, with reference to a timing chart of the switching transistors T1–T12, CT1–CT3 and ST1–ST9 shown in FIG. 6. It is to be noted that, in FIG. 6, (a) to (j) indicate the timings when the switching transistors are turned on, while (k) to (m) indicate the timings of bias signals supplied to the photosensors E1–E9, namely the high-level signal V1 and low-level signal V2 released from the shift register 205.

At first, the switching transistors ST1–ST9 are given the low-level signal while the common electrodes of the photosensors E1–E9 are given the high-level signal V1, whereby, when the light enters the photosensors E1–E9, charges corresponding to the incident light intensity are accumulated in the capacitors C1–C9 through the common electrodes 201–204.

Then, at first a high-level signal is released from the first output terminal of the shift register 106 to turn on the switching transistors T1–T3 [FIG. 6(a)], whereby the charges accumulated in the capacitors C1–C3 are respectively transferred to the capacitors C10–C12.

Then the high-level signal released from the shift register 107 is shifted to turn on the switching transistors T10–T12 in succession [FIG. 6(d)–(f)], whereby the optical information of the first block, transferred to and accumulated in the capacitors C10–C12 are read in succession through the amplifier 105.

After the reading of the information of the first block, a high-level signal is applied to the terminal 108 from an external circuit, whereby the switching transistors CT1–CT3 are simultaneously turned on [FIG. 6(g)].

Thus, the remaining charges in the capacitors C10–C12 are completely dissipated.

When the charges remaining in the capacitors C10–C12 are completely dissipated, the shift register 106 effects a shift to release the high-level signal from the second output terminal, whereby the switching transistors T4–T6 are turned on [FIG. 6(b)] and the charges accumulated in the capacitors C4–C6 of the second block are transferred to the capacitors C10–C12.

At the same time, a high-level signal is released from the first output terminal of the shift register 205 to turn on the switching transistors ST1–ST3 [FIG. 6(h)], and a low-level signal V2 is released from the first output terminal of the shift register 201, serving as the reference voltage source, thereby completely dissipating the charges remaining in the capacitors C1–C3.

In this manner there are conducted, in parallel manner, the discharge operation of the capacitors C1–C3 of the first block and the transfer operation of the charges from the capacitors C4–C6 of the second block to the capacitors C10–C12.

Thereafter the above-explained operations are repeated for each block.

In the second embodiment explained above, the bias levels V1, V2, supplied to the photosensors E1–E9 shown in (k), (l) and (m) in FIG. 6, need not satisfy a relation V1>V2 but can be arbitrarily selected. This fact is different from the first embodiment and is one of the effects provided by the second embodiment. For example, when a condition V1<V2 is employed, discharge is caused according to the optical information and the difference in the amount of charge is read as in the first embodiment.

Also in the foregoing first embodiment, it has been explained that the accumulating capacitors C1–C9 are charged by the bias voltage V1 applied to the photosensors E1–E9, but this is based on an assumption that the threshold value ($V_{th}$) of the transistors ST1–ST9 is 0 V. Consequently, for example if $V_{th}$ is +1.0 V, the capacitors C1–C9 are charged only to a potential V1–$V_{th}$(1.0).

On the other hand, in the second embodiment, since the gate electrodes are independent, there can be obtained a specific advantage that the accumulating capacitors can be completely charged or discharged to the bias level of the photosensors E1–E9 by selecting a sufficiently high bias voltage (15–20 V).

In the second embodiment, therefore, since the accumulating capacitors of a block already subjected to information reading can be completely charged to an arbitrary voltage regardless of $V_{th}$ of the transistors, there can be reduced the time required for the transfer of information of each block to the capacitors C10–C12. It is also rendered possible to improve the reliability of image reading.

The present embodiment has been explained by nine elements, serving as photosensors and switching transistors, divided into three blocks, but such structure is not limitative. It will be understandable from this embodiment that an arbitrary number of such elements can be divided into an arbitrary number of blocks.

Figure 7:
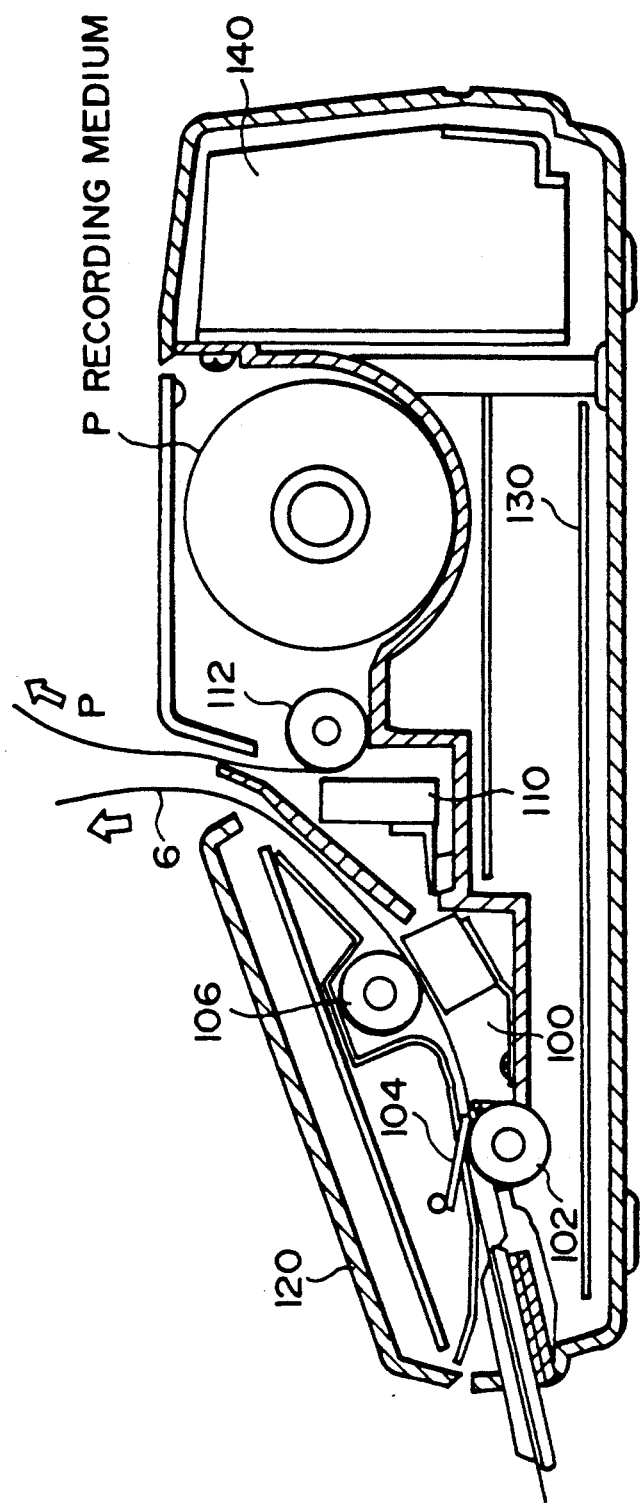
FIG. 7 is a schematic view of an image information processing apparatus of the present invention.

FIG. 7 illustrates a facsimile apparatus with a communicating function, as an example of the image information processing apparatus employing the image reading device of the present invention. There are shown a feed roller 102 constituting feed means for feeding the original 6 to a reading position; a separating member 104 for securely separating the originals 6 one by one; and a platen roller 106 provided at the reading position opposite to a sensor unit thereby defining the surface of the original 6 to be read, and also serving for transporting the original 6.

Recording medium P is composed, in the illustrated example, of rolled sheet, on which reproduced is the image information read by the sensor unit or transmitted from the outside. A recording head 110, serving as recording means for effecting formation of said image, may be of various types such as a thermal head or an ink jet recording head. Said recording head can be a serial type or a line type. A platen roller 112 serves to transport the recording medium P to the recording position by the recording head 110 and to define the recording surface of said recording medium.

An operation panel 120, serving as input/output means, is provided with switches for entering instructions, and a display unit for displaying the state of the apparatus by messages, etc.

A system control board 130, serving as control means, is provided with a controller for controlling various units, a driver for the photoelectric converting elements, a processor for the image information, a transmit/receiving unit etc. There is also provided a power source 140.

The recording means to be employed in the image information processing apparatus of the present invention is preferably based on a method of which basic constitution and principle are disclosed for example in the U.S. Pat. Nos. 4,723,129 and 4,740,796. Said method is based on applying at least one driving signal which gives rapid temperature elevation exceeding nuclear boiling point corresponding to the recording information, on an electrothermal converting element arranged corresponding to an ink-holding sheet or a liquid channel, whereby heat energy is generated at the electrothermal converting element to induce film boiling on a heat acting surface of the recording head and bubbles can be formed in the liquid ink corresponding one-by-one to said driving signal. The liquid ink is discharged from a discharge opening by the growth and shrinkage of said bubbles, thereby forming at least a liquid droplet.

A full-line multiple type recording head, having a length corresponding to the maximum width of the recording medium recordable on the apparatus, may be composed, as described in the above-mentioned patents, of a combination of plural recording heads or an integral recording head.

The present invention is effective also in case of using an interchangeable chiptype recording head which can make electrical connections with or can receive ink supply from the main body of the apparatus by mounting thereon, or a cartridge type recording head provided integrally with an ink tank.

As detailedly explained in the foregoing, the image reading device of the present embodiment employs photoelectric converting elements with the function of switching elements and dissipates charges, representing the optical information, from the accumulating capacitors through said elements, whereby said accumulating capacitors can be sufficiently discharged within a short time after the transfer of charges, representing the optical signals, from said accumulating capacitors to readout capacitors. Consequently the charges accumulating as signals of a line are not affected by the charges in a preceding line in the sub scanning direction, and the precision and reliability of image reading are significantly improved. Also, since the accumulating capacitors can be sufficiently discharged, the time required for the transfer of the signal charges to the readout capacitors need not be prolonged in consideration of the discharging time, so that the functioning speed of the entire apparatus can be increased.

What is claimed is:

1. An image reading device comprising:
   a plurality of first accumulating means;
   a plurality of phototransistors each having a first main electrode, a second main electrode, and a control electrode, first main electrodes of said plurality of phototransistors being connected in common and being selectively connectable to a reference voltage source, second main electrodes of said plurality of phototransistors being connected to said plurality of first accumulating means;
   switch means;
   a plurality of second accumulating means connected respectively to said plurality of first accumulating means through said switch means;
   readout means for reading, in serial, signals accumulated in said plurality of second accumulating means; and
   reset means connected to the control electrodes of said phototransistors to drive said phototransistors thereby resetting the signals accumulated in said first accumulating means through said phototransistors.

2. An image reading device comprising:
   a plurality of first accumulating means;
   a plurality of phototransistors each having a first main electrode, a second main electrode, and a control electrode, first main electrodes of said plurality of phototransistors being selectively connectable in serial to a reference voltage source, second main electrodes of said plurality of phototransistors being connected to said plurality of first accumulating means;
   switch means;
   a plurality of second accumulating means connected respectively to said plurality of first accumulating means through said switch means;
   readout means for reading out signals accumulated in said plurality of second accumulating means; and
   reset means connected to the control electrodes of said phototransistors and adapted to drive said phototransistors thereby resetting the signals accumulated in said first accumulating means through said phototransistors.

3. A device according to claim 2, wherein each said first main electrode is connected to a corresponding control electrode, and wherein said reset means includes said reference voltage source to supply a reset reference voltage.

4. A device according to claim 2, wherein each said phototransistor comprises a thin film transistor including a non-monocrystalline semiconductor thin film.

5. A device according to claim 2, wherein each said first main electrode is connected to the corresponding control electrode.

6. A device according to claim 2, wherein each said first main electrode is connected to a corresponding control electrode, and wherein said reset means includes said reference voltage source to supply a reset voltage to each said first main electrode and the corresponding control electrode simultaneously.

7. An image reading device comprising:
a plurality of photoelectric converting elements;
a plurality of accumulating elements provided respectively corresponding to said plurality of photoelectric converting elements and adapted to accumulate output signals thereof;
switch means for reading out the signals accumulated in said accumulating elements as optical information;
each said photoelectric converting element comprising a switch portion and a sensor portion; and
means for driving said photoelectric converting elements by activating the switching portions to release the accumulated charges from said accumulating elements through said photoelectric converting elements in order to reset said accumulating elements;
wherein said driving means includes a shift register, and wherein each of said switching portions comprises a field effect transistor a gate electrode of which is connected to said shift register; and
wherein said gate electrode is connected to either of the source and drain electrodes of said field effect transistor.

8. An image information processing device comprising:
a plurality of photoelectric converting elements;
a plurality of accumulating elements provided respectively corresponding to said plurality of photoelectric converting elements and adapted to accumulate output signals thereof;
switch means for reading out the signals accumulated in said accumulating elements as optical information;
each said photoelectric converting element comprising a switching portion and a sensor portion; and
means for driving said photoelectric converting elements by activating the switching portions to release the accumulated charges from said accumulating elements through said photoelectric converting elements in order to rest said accumulating elements;
wherein said driving means includes a shift register, and wherein each of said switching portions comprises a field effect transistor a gate electrode of which is connected to said shift register; and
wherein said gate electrode is connected to either of the source and drain electrodes of said field effect transistor.

9. A device according to claim 7 or 8, wherein said sensor portion of each said photoelectric converting element includes a non-monocrystalline semiconductor thin film, and wherein each said transistor includes said thin film as a channel area.

10. An image information processing device comprising:
a plurality of first accumulating means;
a plurality of phototransistors each having a first main electrode, a second main electrode, and a control electrode, first main electrodes of said plurality of phototransistors being connected in common and being selectively connectable to a reference voltage source, and second main electrodes of said plurality of phototransistors being connected to said plurality of first accumulating means;
switch means;
a plurality of second accumulating means connected respectively to said plurality of first accumulating means through said switch means;
readout means for reading, in serial, signals accumulated in said plurality of second accumulating means; and
reset means connected to the control electrodes of said phototransistors to drive said phototransistors thereby resetting the signals accumulated in said first accumulating means through said plurality of phototransistors.

11. A device according to claim 1 or 10, wherein each said first main electrode is connected to a corresponding control electrode, and wherein said reset means includes said reference voltage source to supply a reference voltage for resetting.

12. A device according to claim 1 or 10, wherein each said phototransistor comprises a thin film transistor including a non-monocrystalline semiconductor thin film.

13. A device according to claim 1 or 10, wherein each said first main electrode is connected to the corresponding control electrode.

14. A device according to claim 1 or 10, wherein each said first main electrode is connected to a corresponding control electrode, and wherein said reset means includes said reference voltage source to supply a reset voltage to each said first main electrode and the corresponding control electrode simultaneously.

15. An image information processing device comprising:
a plurality of first accumulating means;
a plurality of phototransistors each having a first main electrode, a second main electrode, and a control electrode, first main electrodes of said plurality of phototransistors being selectively connectable in serial to a reference voltage source, second main electrodes of said plurality of phototransistors being connected to said plurality of first accumulating means;
switch means;
a plurality of second accumulating means connected respectively to said plurality of first accumulating means through said switch means;
readout means for reading out signals accumulated in said plurality of second accumulating means; and
reset means connected to the control electrodes of said phototransistors and adapted to drive said phototransistors thereby resetting the signals accumulated in said first accumulating means through said phototransistors.

16. A device according to claim 8, 10, or 15, further comprising an original holding means for holding an original carrying image information onto a reading portion.

17. A device according to claim 8, 10, or 15, further comprising a recording means for recording read image information.

18. A device according to claim 8, 10, or 15, further comprising an original supporter for holding an original carrying image information, and a recorder for recording read image information.

19. A device according to claim 8, 10, or 15, further comprising an ink jet head for recording read image information.

20. A device according to claim 8, 10, or 15, further comprising an ink jet head for emitting an ink by thermal energy in order to record read image information.

21. A device according to any one of claims 1, 2, 7, 8, 10, or 15, wherein said switch means includes a plurality of transistors provided respectively corresponding to said first accumulating means, and wherein gate lines and either of source and drain lines of said plurality of transistors are connected in a matrix structure.

22. A device according to claim 21, wherein said gate lines are connected to a shift register, and wherein said source or drain lines are connected to said switch means through an amplifier.

23. An image reading device comprising:
 a plurality of accumulating means;
 a plurality of phototransistors each having a first main electrode, a second main electrode, and a control electrode, first main electrodes of said plurality of phototransistors being selectively connectable to a reference voltage source, second main electrodes of said plurality of phototransistors being connected to said plurality of accumulating means;
 readout means for reading out signals accumulated in said plurality of accumulating means; and
 reset means connected to said control electrodes of said phototransistors to drive said phototransistors thereby resetting the signals accumulated in said accumulating means through said phototransistors.

24. An image information processing device:
 a plurality of accumulating means;
 a plurality of phototransistors each having a first main electrode, a second main electrode, and a control electrode, first main electrodes of said plurality of phototransistors being selectively connectable to a reference voltage source, second main electrodes of said plurality of phototransistors being connected to said plurality of accumulating means;
 readout means for reading out signals accumulated in said plurality of accumulating means; and
 reset means connected to said control electrodes of said phototransistors to drive said phototransistors thereby resetting the signals accumulated in said accumulating means through said phototransistors.

25. A device according to claims 23 or 24, wherein each said first main electrode is connected to a corresponding control electrode, and wherein said reset means includes a reference voltage source for supplying the reset reference voltage.

26. A device according to claims 23 or 24, wherein each phototransistor comprises a thin film transistor including a non-monocrystalline semiconductor thin film.

27. A device according to claim 24, further comprising an original holding means for holding an original carrying image information at a reading position.

28. A device according to claim 24, further comprising a recording means for recording read image information.

29. A device according to claim 24, further comprising an original supporter for holding an original carrying image information, and a recorder for recording read image information.

30. A device according to claim 24, further comprising an ink jet head for recording read image information.

31. A device according to claim 24, further comprising an ink jet head for emitting an ink by thermal energy in order to record read image information.

* * * * *

UNITED STATES PATENT AND TRADEMARK OFFICE
CERTIFICATE OF CORRECTION

PATENT NO. : 5,317,406
DATED : May 31, 1994
INVENTOR(S) : ISAO KOBAYASHI, ET AL.

It is certified that error appears in the above-identified patent and that said Letters Patent is hereby corrected as shown below:

COLUMN 1

Line 34, "However" should read --However,--.
    Line 52, "respectively" should read --respective--.
    Line 64, "tively" should read --tively,--.

COLUMN 2

Line 12, "tively" should read --tively,--.
    Line 25, "following" should read --following,--.
    Line 43, "Subsequently" should read --Subsequently,--.
    Line 60, "Thus" should read --Thus,--.
    Line 64, "are" should read --is--.

COLUMN 3

Line 1, "are" should read --is--.
    Line 3, "are" should read --is--.

COLUMN 5

Line 44, "$I_{ds}$" should read --$I_{ds}$,--.
    Line 48, "$I_{ds}$" should read --$I_{ds}$,--.
    Line 64, "Thus" should read --Thus,--.

COLUMN 6

Line 3, "manner" should read --manner,--.
    Line 12, "Thus" should read --Thus,--.
    Line 22, "time" should read --time,--.

UNITED STATES PATENT AND TRADEMARK OFFICE
CERTIFICATE OF CORRECTION

PATENT NO. : 5,317,406

DATED : May 31, 1994

INVENTOR(S) : ISAO KOBAYASHI, ET AL.

It is certified that error appears in the above-identified patent and that said Letters Patent is hereby corrected as shown below:

COLUMN 7

Line 42, "following" should read --following,--.
    Line 65, "Then" should read --Then,--.

COLUMN 8

Line 23, "manner" should read --manner,--.
    Line 28, "Thereafter" should read --Thereafter,--.
    Line 40, "Also" should read --Also,--.

COLUMN 9

Line 37, "exceeding" should read --exceeding the--.

COLUMN 10

Line 2, "Consequently" should read --Consequently,--.

COLUMN 11

Line 15, "switch" should read --switching--.
    Line 45, "rest" should read --reset--.

UNITED STATES PATENT AND TRADEMARK OFFICE
CERTIFICATE OF CORRECTION

PATENT NO. : 5,317,406
DATED : May 31, 1994
INVENTOR(S) : ISAO KOBAYASHI, ET AL.

It is certified that error appears in the above-identified patent and that said Letters Patent is hereby corrected as shown below:

COLUMN 13

Line 30, "device:" should read --device comprising:--.

Signed and Sealed this

Twenty-seventh Day of December, 1994

Attest:

BRUCE LEHMAN

Attesting Officer

Commissioner of Patents and Trademarks